United States Patent
Artis et al.

(10) Patent No.: US 7,286,093 B2
(45) Date of Patent: Oct. 23, 2007

(54) FREQUENCY DISPERSIVE ANTENNA APPLIED IN PARTICULAR TO A METEOROLOGICAL RADAR

(75) Inventors: Jean-Paul Artis, Plouzane (FR); Gérard Debionne, Mery sur Oise (FR); Georges Guillaumot, Tigery (FR); Maxence Marcant, Milizac (FR)

(73) Assignee: Thales, Neuilly-sur Seine (FR)

( * ) Notice: Subject to any disclaimer, the term of this patent is extended or adjusted under 35 U.S.C. 154(b) by 0 days.

(21) Appl. No.: 11/445,461

(22) Filed: Jun. 2, 2006

(65) Prior Publication Data
US 2007/0013598 A1 Jan. 18, 2007

(30) Foreign Application Priority Data
Jun. 3, 2005 (FR) .................................. 05 05649

(51) Int. Cl.
*H01Q 13/10* (2006.01)
(52) U.S. Cl. ..................... 343/771; 343/770; 343/772; 333/113; 333/114
(58) Field of Classification Search ................ 343/771, 343/770, 772; 333/113, 114
See application file for complete search history.

(56) References Cited
U.S. PATENT DOCUMENTS

| | | | |
|---|---|---|---|
| 4,742,355 A | | 5/1988 | Wolfson et al. |
| 5,079,561 A | * | 1/1992 | Park .......................... 343/771 |
| 5,973,647 A | * | 10/1999 | Barrett et al. ................ 343/713 |
| 6,476,772 B1 | * | 11/2002 | Smith et al. ................. 343/771 |
| 6,972,727 B1 | * | 12/2005 | West et al. .................. 343/771 |

FOREIGN PATENT DOCUMENTS

GB 1212556 A 11/1970

* cited by examiner

*Primary Examiner*—Hoang V. Nguyen
(74) *Attorney, Agent, or Firm*—Lowe Hauptman & Berner, LLP

(57) ABSTRACT

The invention relates to a frequency dispersive antenna comprising radiating waveguides divided into three legs. The indirect angle between the first and second leg is greater than or equal to 90 degrees and less than 180 degrees, the direct angle between the second and third leg being greater than or equal to 90 degrees and less than 180 degrees. The antenna comprises a feed waveguide comprising a stack of elements divided into three adjacent legs, the direct angle between the first and second leg being greater than or equal to 90 degrees and less than 180 degrees, the indirect angle between the second and third leg being greater than or equal to 90 degrees and less than 180 degrees. In particular, the invention applies to an airborne antenna suitable for the detection and for the pinpointing of meteorological phenomena.

9 Claims, 7 Drawing Sheets

FREQUENCY DISPERSIVE ANTENNA APPLIED IN PARTICULAR TO A METEOROLOGICAL RADAR

Figure 1:
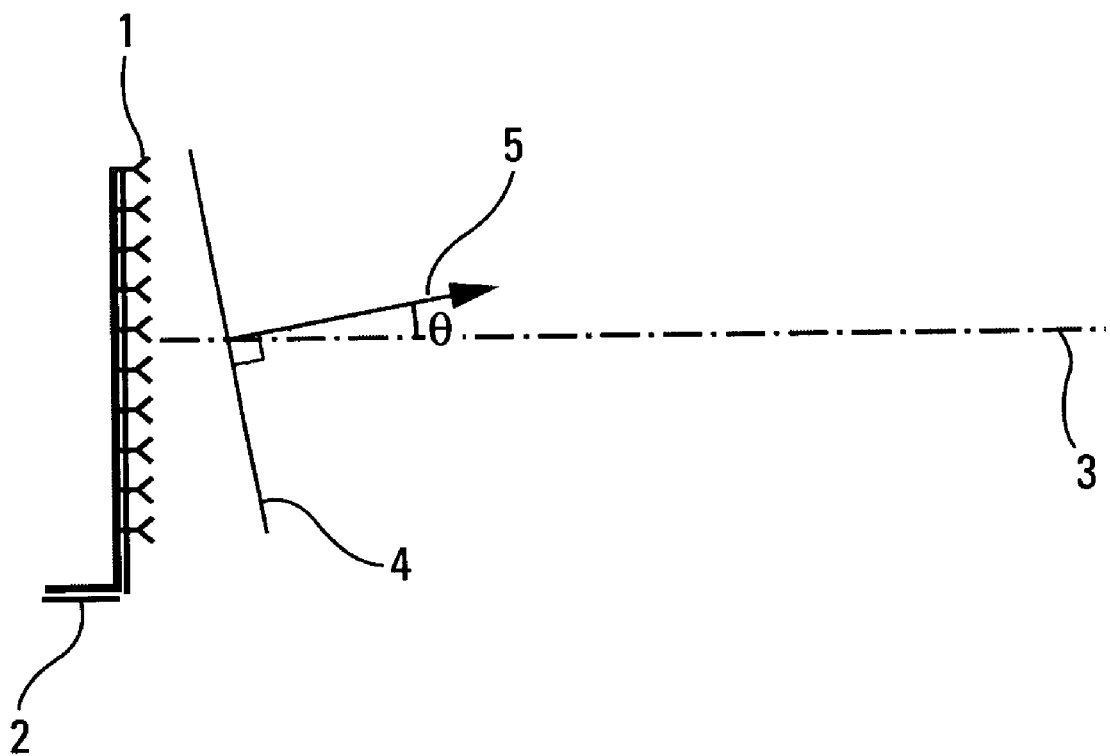

The invention relates to a frequency dispersive antenna. In particular, the invention applies to an airborne antenna suitable for the detection and for the pinpointing of meteorological phenomena.

Airborne meteorological radars comprise for the most part an antenna whose scanning in bearing and in elevation is carried out mechanically. The inertia of the antenna as well as the desired degree of agility of the beam influence the choice of the motors included in the scanning mechanisms. Such mechanisms may on account of their complexity become particularly expensive.

In order to produce a less expensive antenna, it may in particular be opportune to resort to electronic scanning, at least in elevation, instead of the conventional scanning mechanisms. Specifically, the analysis of the short and long range meteorological domain requires only a few degrees of scanning in elevation, typically plus or minus 3 degrees. In the case where the scanning in bearing is ensured by a conventional mechanism over plus or minus 90 degrees for example, a single bearing scan is required to analyse the whole of the meteorological domain. The performance constraints on the motors performing the scan are considerably reduced without however degrading the scanning performance of the antenna.

The conventional solutions based on RF phase shifters implemented in an antenna with electronic scanning are hardly suitable for the design of an inexpensive antenna. Specifically, to obtain a reception pattern where the sidelobes and diffuse lobes of the signal received by the antenna are lower by at least 30 dB with respect to the radiation maximum, the required number of phase shifters becomes prohibitive in terms of cost. Furthermore, the electrical consumption of an antenna comprising RF phase shifters is high, thereby complicating integration in an aircraft where the electrical and thermal conditioning resources are limited.

Moreover, the reliability of such an antenna with electronic scanning turns out to be particularly sensitive to the failure rates of its controllable RF phase shifters. The predictive calculation of the reliability of the antenna being tricky since the rejection of the sidelobes and diffuse lobes degrade as a function in particular of the number of failed phase shifters and of the position of the latter, it is difficult to guarantee a level of service.

The invention is in particular aimed at alleviating the aforesaid drawbacks. In particular, but not exclusively, the invention is aimed at allowing an inexpensive meteorological radar antenna. For this purpose, the invention is aimed at an antenna comprising:

radiating waveguides, comprising at least three adjacent legs, the angle between the first leg and the central leg being in the clockwise sense greater than or equal to 90 degrees and less than 180 degrees, the angle between the central leg and the third leg being in the anticlockwise sense greater than or equal to 90 degrees and less than 180 degrees, at least one coupling slot being disposed on the rear face of the central leg of each radiating waveguide;

at least one feed waveguide comprising a stack of elements, the said elements comprising at least three adjacent legs, the angle between the first leg and the central leg being in the anticlockwise sense greater than or equal to 90 degrees and less than 180 degrees, the angle between the central leg and the third leg being in the clockwise sense greater than or equal to 90 degrees and less than 180 degrees, at least one coupling slot being disposed on the front face of the central leg of each element of each feed waveguide.

The coupling slot of each radiating waveguide is merged with the coupling slot of an element of the feed waveguide. The central leg of each radiating waveguide is crossed with the central leg of an element of the feed waveguide. The variation of the direction of pointing of the beam of the antenna in at least one plane is obtained by varying the frequency of the wave guided by the feed waveguide. The length of the feed waveguide between the coupling slots of two adjacent radiating waveguides is greater than the distance separating the coupling slots of these two adjacent radiating waveguides.

In an advantageous manner, the first leg and the last leg of each radiating waveguide are substantially parallel.

Advantageously, the first leg and the last leg of each element of the feed waveguide are substantially parallel.

According to an aspect of the invention, the elements of the feed waveguide are positioned in a plane parallel to the radiating waveguides.

In an advantageous manner, the elements of the feed waveguide can be flat slot waveguides. Likewise, the radiating waveguides can be for example flat slot waveguides.

According to yet another aspect of the invention, the feed waveguide operates in progressive mode.

According to yet another aspect of the invention, the radiating waveguides operate in resonant mode.

The antenna can in particular be used in a radar suitable for the detection and for the pinpointing of meteorological phenomena.

The invention has in particular the advantages that the structure of the sidelobes of the pattern of an antenna according to the invention is not affected by the variation of pointing of the beam of the antenna whatever the frequency of the RF signal emitted in the operating band, that it allows a particularly compact embodiment depthwise and that it is simple to implement.

Figure 2A:
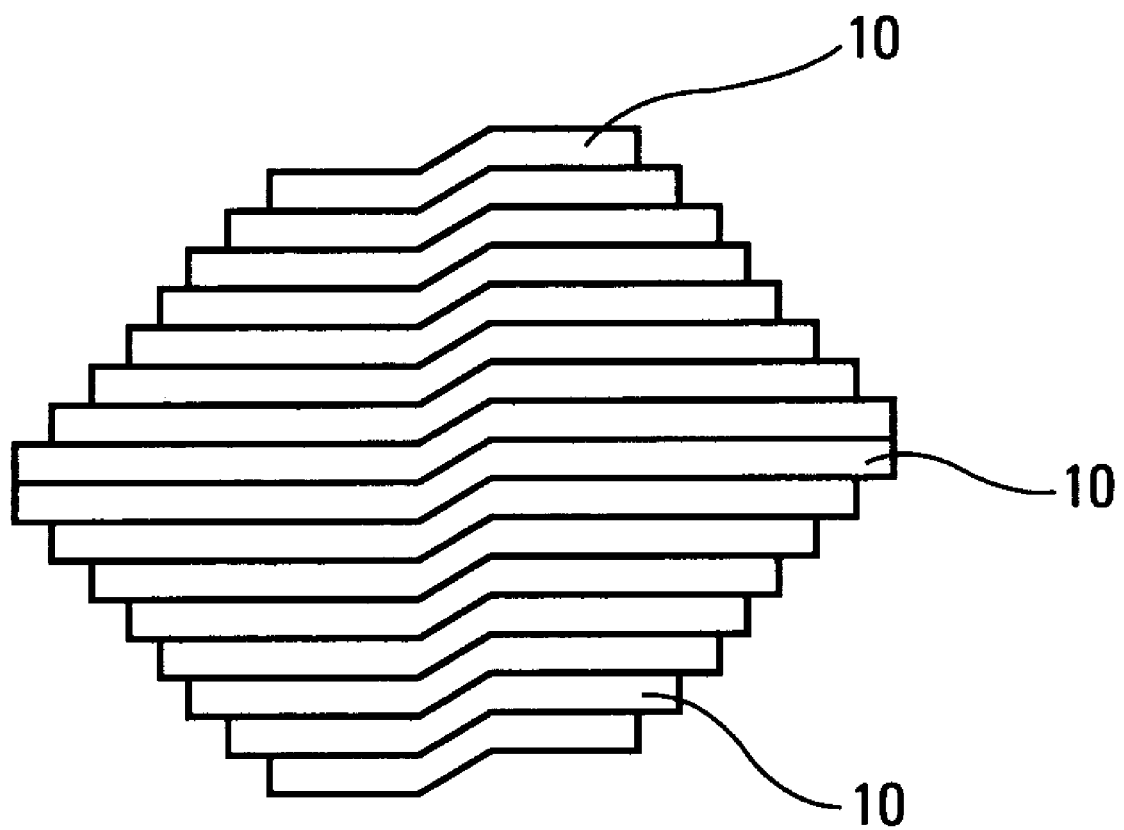
Figure 2B:
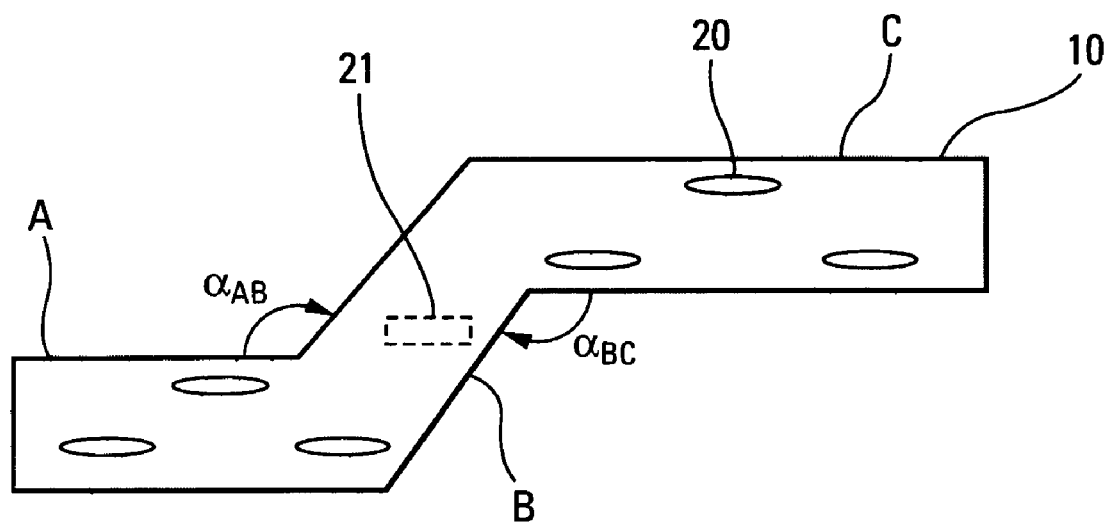
Figure 2C:
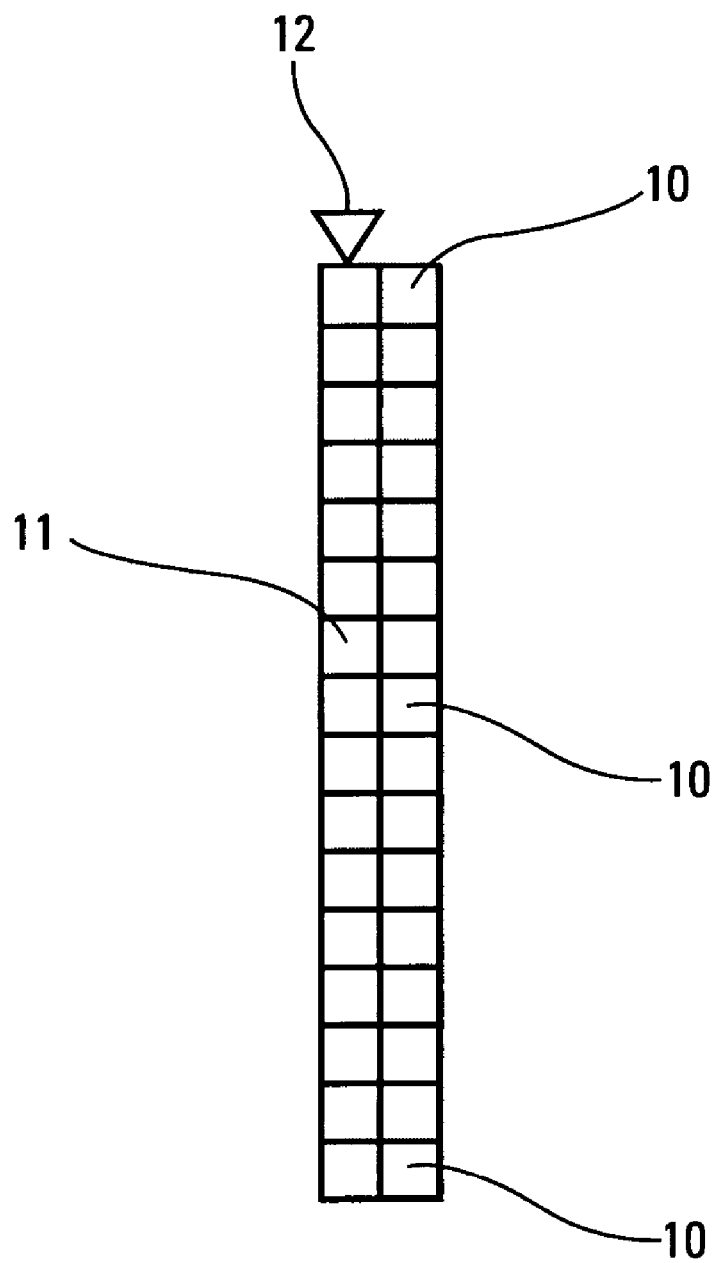
Figure 2D:
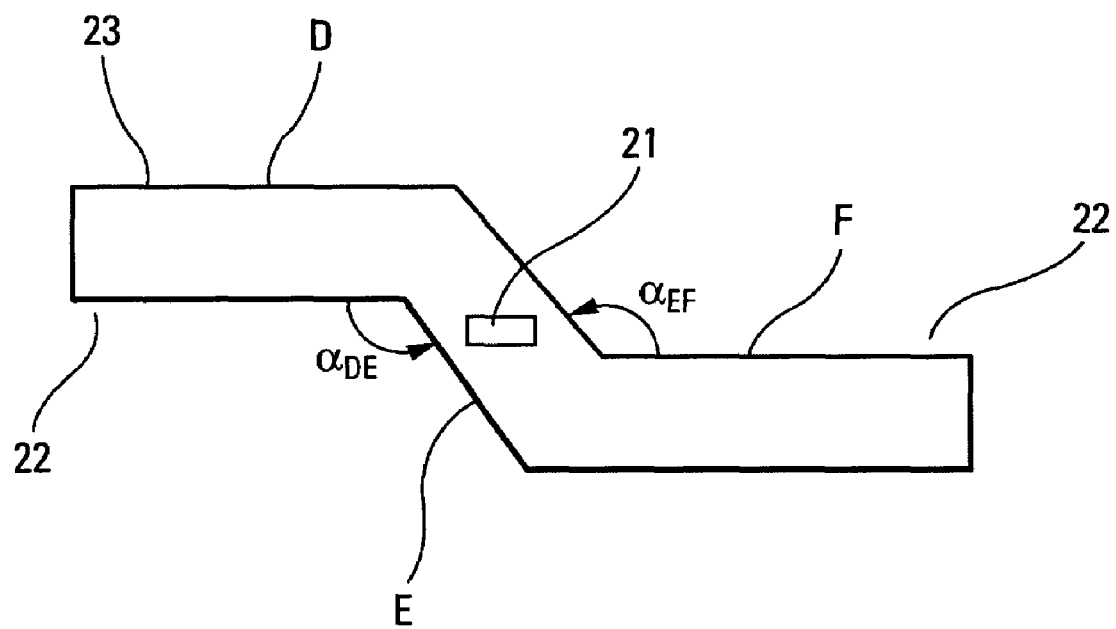
Figure 2E:
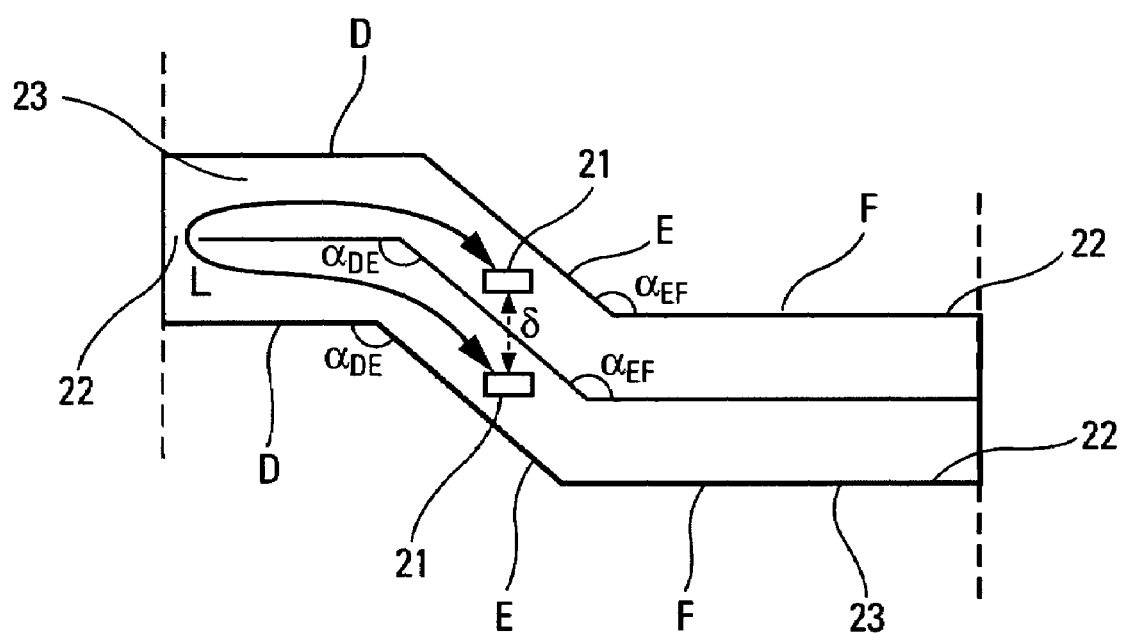
Figure 3:
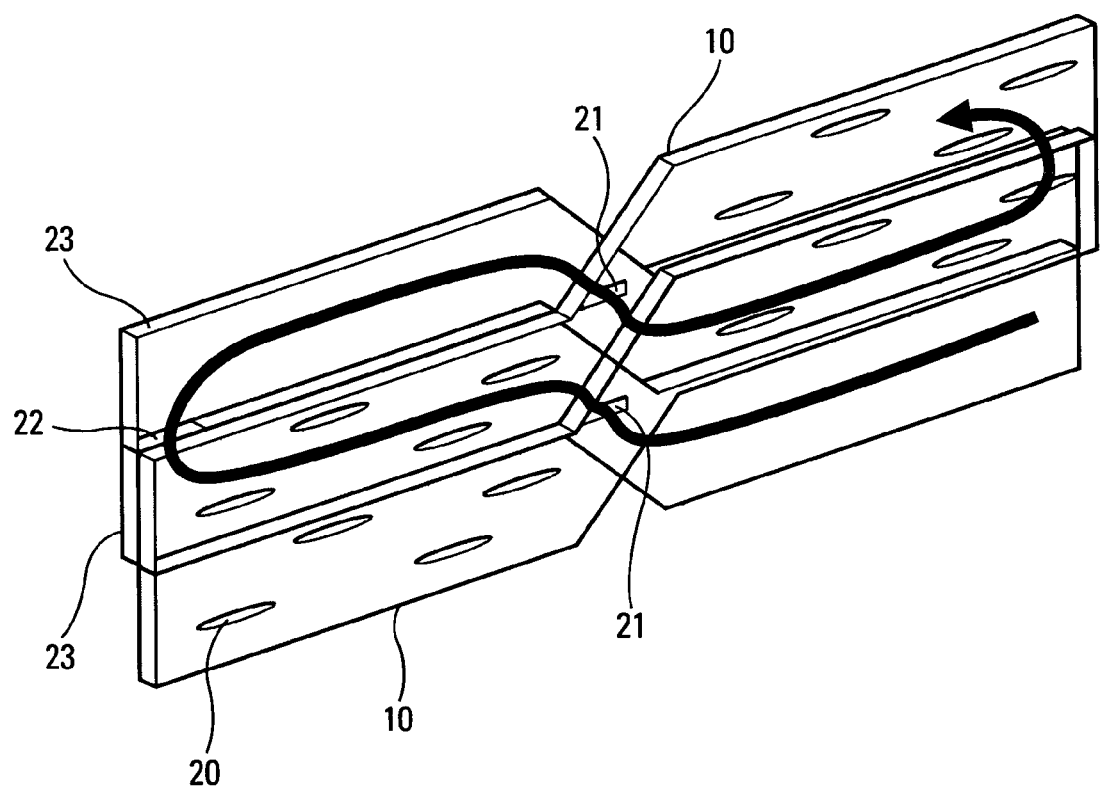

Other characteristics and advantages of the invention will appear with the aid of the description which follows, offered in relation to the appended drawings which represent:

FIG. 1, a principle of electronic scanning implemented on a radar antenna;

FIG. 2a, an antenna according to the invention seen face on;

FIG. 2b, a radiating waveguide according to the invention;

FIG. 2c, an antenna according to the invention seen in profile;

FIG. 2d, an element of the feed waveguide according to the invention;

FIG. 2e, a detail of the feed waveguide according to the invention;

FIG. 3, a detail of the coupling between a radiating waveguide and an element of the feed waveguide.

The following description takes in particular as example an airborne meteorological radar comprising an antenna carrying out elevational electronic scanning of its beam. However, the invention can apply equally to any antenna whose beam scan is performed in at least one plane in a nonmechanical manner.

FIG. 1 illustrates a principle of electronic scanning implemented on a radar antenna. The electronic scanning of the beam formed by the radar antenna can be obtained by phase shifting with respect to one another the emission and reception pathways of an array of slots on the surface of the antenna. FIG. 1 shows a radar antenna comprising slots 1 ensuring the reception and the emission of RF signals. These slots 1 are made on a right feed waveguide 2. The right feed waveguide 2 makes it possible to convey the electromagnetic waves generated and amplified upstream towards the assembly of slots 1. Reciprocally, the right feed waveguide 2 makes it possible to conduct the electromagnetic waves received by way of the slots 1 towards the upstream devices charged in particular with the amplification, the processing and the interpretation of the received signals. In FIG. 1, an axis 3 is disposed perpendicularly to the plane in which the slots 1 are gouged. This axis 3 cuts the plane comprising the slots 1 at a point situated at the centre of the array of slots 1. The antenna forms a beam 5 in the elevational direction of pointing desired with respect to the axis 3 and denoted θ. In the same plane is represented an inclined plane 4 perpendicular to the pointing direction θ. This plane 4, called the phase plane, represents the phase shift of the RF waves received or emitted as a function of the vertical position of the slots 1 so as to carry out a pointing in the desired direction of pointing θ. The above description illustrates the known principle of electronic scanning in elevation. The principle is identical for scanning in bearing.

Hence, to carry out electronic scanning, it is appropriate to modify the phase of the electromagnetic waves received or emitted by the slots 1 as a function of their relative position and of the wave plane 4 corresponding to the desired direction of pointing θ. By varying the wavelength of the electromagnetic waves traversing the right feed waveguide 2 in a given interval of frequencies, it is thus possible to produce a wave plane 4 as illustrated in FIG. 1. The amplitude of these variations, and hence the angular sector covered by the antenna in a given plane, is in particular dependent on the length of the right feed waveguide 2 between the slots 1.

A wave traversing the right feed waveguide 2 has in particular as characteristic a wavelength $\lambda_0$. Two adjacent slots 1 are spaced apart by a distance δ, close to 0.7 times the wavelength $\lambda_0$ for example. In the case of an antenna carrying out a scan in elevation, the slots 1 can be disposed horizontally in line, each line forming a group spaced apart by the distance δ, close to 0.7 times the wavelength $\lambda_0$ for example. The length L corresponds to the actual linear distance traversed by the electromagnetic wave in the right feed waveguide 2 between two adjacent slots 1 or two adjacent groups of slots 1.

By the principle of electronic scanning, it is necessary to create a phase difference $\phi_n$ between the first slot 1 for example and the $n^{th}$, the antenna comprising on its surface n slots 1, numbered in the description from 1 to n. If the frequency of the electromagnetic wave traversing the right feed waveguide 2 is denoted f and $\lambda_g$ the corresponding wavelength, the phase difference $\phi_n$ can be defined according to the following formula $$\varphi_n = \frac{2\pi}{\lambda_g} \cdot n \cdot L.$$

On the basis of this formula and of the amplitudes of the waves incident on the n slots 1 by electromagnetic coupling, denoted $\{A_n\}$, it is possible to obtain an estimation of the gain in emission and in reception G as a function of the direction of pointing θ given by applying the formula $$G(\theta) = \sum_n A_n \cdot e^{j\left(\frac{2\pi}{\lambda} \cdot n \cdot \delta \cdot \sin(\theta) - \varphi_n\right)}.$$

This equation admits a maximum, corresponding to the radiation maximum, or main lobe at $\theta_0$ such that, if λ is the length of the wave in vacuo at the frequency f considered and k an even or odd integer making it possible to bring the sine back to between −1 and 1, $$\sin(\theta_0) = \frac{\lambda}{\delta} \cdot \left(\frac{L}{\lambda_g} - \frac{k}{2}\right).$$

k can in particular be chosen by taking the integer value closest to $L/(\lambda_g/2)$ i.e. for example $$k = E\left(\frac{\frac{L}{\lambda_g}}{2} + \frac{1}{2}\right).$$

The ratio $$\frac{\lambda}{\lambda_g}$$

varying with frequency, it is possible to make the angle θ of pointing of the antenna vary by a few degrees by varying the frequency applied to the feed waveguide 2 of the array of slots 1. The bigger the length L between 2 slots 1 or groups of slots 1, the larger the available angular span for a given frequency band.

The right feed waveguide 2 possesses in particular as characteristic a cutoff frequency $f_c$ of its fundamental mode. The frequency band Δf, in which the frequency of the wave guided in the right feed waveguide 2 can change so as to modify the direction of pointing θ of the antenna, possesses a central frequency $f_0$. The wavelength in vacuo of the central frequency $f_0$ is denoted $\lambda_0$. If the electromagnetic wave traversing the right feed waveguide 2 has a frequency equal to the central frequency $f_0$, we then obtain a direction of pointing of the beam equal to $\theta_0$ with respect to the mechanical axis of the antenna. The angular excursion Δθ in radians expressing the angular span available for a given frequency band can be evaluated according to the formula:

$$\Delta\theta = \frac{1}{\delta \cdot \cos\theta_0}\left[L\frac{\left(\frac{\lambda_0}{\lambda_c}\right)^2}{\sqrt{1-\left(\frac{\lambda_0}{\lambda_c}\right)^2}} + \frac{k}{2} \cdot \lambda_0\right] \cdot \frac{\Delta f}{f_0}.$$

FIG. 2a shows an antenna according to the invention seen face on. In the case of an antenna carrying out a scan in elevation, the slots 1 can be disposed horizontally in line, each line forming a group. The average distance between two adjacent groups, measured for example between the respective centres of gravity of the two groups, is substantially equal to the distance δ, close to 0.7 times the wavelength $\lambda_0$ for example. A group of slots 1 can for example be produced on a radiating waveguide 10. The radiating waveguide 10 can for example be a flat slot guide. By electromagnetic coupling, a wave traversing the radiating waveguide 10 is emitted by way of the slots 1. Reciprocally, by electromagnetic coupling, the incident electromagnetic waves received by way of the slots 1 are transmitted to the radiating waveguide 10.

In an embodiment, the radiating waveguide 10 operates in resonant mode. For this purpose, the radiating waveguide 10 terminates in short-circuits at each end.

The antenna presented in FIG. 2a comprises several adjacent radiating waveguides 10, arranged so as to form an antenna whose front face has a substantially circular form. Also, the antenna could equally well comprise a different number of lines or else a totally different form, as for example a rectangular form. The radiating waveguides 10 can for example be produced on the basis of flat slot waveguides, exhibiting a rectangular cross section.

FIG. 2b shows a radiating waveguide 10 according to the invention. In an embodiment, the radiating waveguide 10 comprises at least three adjacent legs: a first leg A, a central leg B and a third leg C. In the central part of the rear face of the leg B of the radiating waveguide 10 is sliced a coupling slot 21. This coupling slot 21 is substantially disposed at the centre of the rear face of the leg B of the radiating waveguide 10 so that the contribution of each slot 1 to the formation of a wave in the radiating waveguide 10 is equivalent. The lengthwise coupling slot 21 can be substantially parallel to the legs B and C of the radiating waveguide 10. In other applications, it could be desirable to arrange this coupling slot 21 differently. Slots 1 are drilled on the front face of the various legs A, B and C of the radiating waveguide 10. Several coupling slots 21 could for example be drilled if several feed waveguides 2 were used.

In a particular embodiment, the legs A, B and C are substantially in the same plane. The leg A forms with the leg B an angle $\pi_{AB}$. The angle $\alpha_{AB}$ oriented in the clockwise sense is greater than or equal to 90 degrees and less than 180 degrees. Likewise, the leg B forms with the leg C an angle $\alpha_{BC}$. The angle $\alpha_{AB}$ oriented in the anticlockwise sense is greater than or equal to 90 degrees and less than 180 degrees. In a particular embodiment, the legs A and C are substantially parallel and hence the angles $\alpha_{AB}$ and $\alpha_{BC}$ are substantially equal. The exact values of the angles $\alpha_{AB}$ and $\alpha_{BC}$ are determined as a function of the angle of the coupling slot 21 of the radiating waveguide 10 with respect to the feed waveguide 2 and of the level of electromagnetic coupling desired. This embodiment can however be generalized to the case where the legs A, B and C are not in one and the same plane. In this case, the arrangement of the various legs A, B and C as well as their respective orientation then remain identical to what was described above by projection in one and the same plane.

FIG. 2c shows an antenna seen in profile according to the invention. The antenna in particular comprises a feed waveguide 11 positioned here lengthwise parallel to the radiating waveguides 10. Each radiating waveguide 10 is coupled electromagnetically at at least one point with the feed waveguide 11. The feed waveguide 11 is positioned in the plane parallel to the plane in which the radiating waveguides 10 are gouged. Furthermore, this arrangement exhibits the advantage of rendering the antenna compact in terms of depth via the feed waveguide 11.

In an embodiment, the feed waveguide 11 operates in progressive mode. For this purpose, a suitable load 12 is positioned at an end of the feed waveguide 11. Specifically, the wave feeding the guide is then not reflected by the end of the feed waveguide 11.

FIG. 2d shows an exemplary embodiment of a feed waveguide 11 according to the invention. The feed waveguide 11 can in particular comprise a vertical stack of elements 23, each element 23 of the feed waveguide 11 being for example produced on the basis of flat waveguides, exhibiting a rectangular cross section. In an embodiment, each element 23 of the feed waveguide 11 comprises at least three adjacent legs: a first leg D, a central leg E and a third leg F. On the rear face in the central part of the leg E of an element 23 of the feed waveguide 11 is sliced a coupling slot 21. The lengthwise coupling slot 21 can be substantially parallel to the legs D and F of an element 23 of the feed waveguide 11. The coupling slot 21 of an element 23 of the feed waveguide 11 is merged with the electromagnetic coupling slot 21 of a radiating waveguide 10. The thickness of an element 23 of the feed waveguide 11 can furthermore be reduced so as to facilitate the mechanical implementation of the feed waveguide 11 in the form of a serpentine coil.

In a particular embodiment, the legs D, E and F are substantially in the same plane. The leg D forms with the leg E an angle $\alpha_{DE}$. The angle $\alpha_{DE}$ oriented in the anticlockwise sense is greater than or equal to 90 degrees and less than 180 degrees. Likewise, the leg E forms with the leg F an angle $\alpha_{EF}$. The angle $\alpha_{EF}$ oriented in the clockwise sense is greater than or equal to 90 degrees and less than 180 degrees. In a particular embodiment, the legs D and F are substantially parallel and hence the angles $\alpha_{DE}$ and $\alpha_{EF}$ are substantially equal. The exact values of the angles $\alpha_{DE}$ and $\alpha_{EF}$ are determined as a function of the angle of the coupling slot 21 of each element 23 of the feed waveguide 11 with respect to the corresponding radiating waveguide 10 and of the level of electromagnetic coupling desired. This embodiment can however be generalized to the case where the legs D, E and F are not in one and the same plane. In this case, the arrangement of the various legs D, E and F as well as their respective orientation then remain comparable with what was described above by projection in one and the same plane.

FIG. 2e shows a detail of the feed waveguide according to the invention. The feed waveguide 11 comprises a stack of elements 23. For each element 23, on one of the ends, an opening 22 links the element 23 with the previous element 23 in the stack. This opening 22 has a cross section substantially identical to the cross section of the previous element 23 in the stack. On the other end, another opening 22 links the element 23 with the element 23 following in the stack. This other opening 22 has one and the same cross section substantially identical to the cross section of the element 23 following in the stack. The distance between two coupling slots 21 disposed on adjacent elements 23 is equal to a distance $\delta$. The distance that the wave traverses in the feed waveguide 11 has a length L between these two same coupling slots 21. In an embodiment of the antenna according to the invention, this length L is greater than $\delta$. By way of example, for an antenna operating in band X and comprising standard feed waveguides 11 in band X, whose vertical distance $\delta$ between two coupling slots 21 is equal to 25 mm and whose beam must be able to scan in elevation the zone lying between −3 degrees and 3 degrees with respect to the horizon, the length L that the wave traverses in the feed waveguide 11 between these two coupling slots must be at least 157 mm.

FIG. 3 shows a detail of the coupling between a radiating waveguide 10 and an element 23 of the feed waveguide 11.

The coupling slot 21 of an element 23 of the feed waveguide 11 is aligned with the electromagnetic coupling slot 21 of a radiating waveguide 10. The legs A and C of each radiating waveguide 10 as well as the legs D and F of the element 23 of the corresponding feed waveguide 11 are substantially parallel. Moreover, the legs C and D are aligned. The legs A and F are aligned. The angle $\alpha_{DE}$ oriented in the clockwise sense is substantially equal to the opposite of the angle $\alpha_{AB}$ oriented in the clockwise sense. Likewise, the angle $\alpha_{EF}$ oriented in the clockwise sense is substantially equal to the opposite of the angle $\alpha_{BC}$ oriented in the clockwise sense. The legs B and E are hence crossed. Specifically, the longitudinal axis of the central part of the radiating waveguide 10 on which the coupling slot 21 is produced crosses the longitudinal axis of the central part of the element 23 of the feed waveguide 11.

In the case of a radar working in band X, the radiating waveguides 10 can for example be flat slot waveguides of outside dimensions of about 23 mm for the large side and between 5 and 10 mm inside dimension for the small side, the length being determined by the number of slots 1. The thickness has no influence on the parameters dimensioning the antenna. The width of the feed waveguide 11 being 23 mm and the vertical length L of the feed waveguide 11 between two groups of slots 1 being 157 mm, the scan obtained by varying over a span of 100 MHz the frequency f of the wave guided in the feed waveguide 11 then lies between −3 degrees and 3 degrees. The structure of the sidelobes of the antenna pattern in elevation is not modified by the variation of pointing of the beam as a function of frequency.

The invention claimed is:

1. An antenna, comprising:
radiating waveguides, having three adjacent legs, an angle between the first leg and the central leg being in the clockwise sense greater than or equal to 90 degrees and less than 180 degrees, an angle between the central leg and the third leg being in the anticlockwise sense greater than or equal to 90 degrees and less than 180 degrees, a coupling slot being disposed on the rear face of the central leg of each radiating waveguide;
a feed waveguide having a stack of elements, said elements having three adjacent legs, an angle between the first leg and the central leg being in the anticlockwise sense greater than or equal to 90 degrees and less than 180 degrees, an angle between the central leg and the third leg being in the clockwise sense greater than or equal to 90 degrees and less than 180 degrees, a coupling slot being disposed on the front face of the central leg of each element of each feed waveguide;
the coupling slot of each radiating waveguide being merged with the coupling slot of an element of the feed waveguide, the central leg of each radiating waveguide being crossed with the central leg of an element of the feed waveguide, the variation of the direction of pointing of the beam of the antenna in at least one plane being obtained by varying the frequency of the wave guided by the feed waveguide, the length of the feed waveguide between the coupling slots of two adjacent radiating waveguides being greater than the distance separating the coupling slots of these two adjacent radiating waveguides.

2. The antenna according to claim 1, wherein the first leg and the last leg of each radiating waveguide are substantially parallel.

3. The antenna according to claim 1, wherein the first leg and the last leg of each element of the feed waveguide are substantially parallel.

4. The antenna according to claim 1, wherein the elements of the feed waveguide are positioned in a plane parallel to the radiating waveguides.

5. The antenna according to claim 1, wherein the elements of the feed waveguide are flat slot waveguides.

6. The antenna according to claim 1, wherein the radiating waveguides are flat slot waveguides.

7. The antenna according to claim 1, wherein the feed waveguide operates in progressive mode.

8. The antenna according to claim 1 the radiating waveguides operate in resonant mode.

9. The antenna according to claim 1, wherein the antenna is used in a radar suitable for the detection and for the pinpointing of meteorological phenomena.

* * * * *